United States Patent [19]

Jain

[11] Patent Number: 4,935,963
[45] Date of Patent: Jun. 19, 1990

[54] METHOD AND APPARATUS FOR PROCESSING SPEECH SIGNALS

[75] Inventor: Jaswant R. Jain, Plantation, Fla.

[73] Assignee: Racal Data Communications Inc., Sunrise, Fla.

[21] Appl. No.: 376,192

[22] Filed: Jul. 3, 1989

[51] Int. Cl.⁵ .............................................. G10L 3/02
[52] U.S. Cl. ......................................... 381/31; 381/38; 381/49; 381/35
[58] Field of Search ...................................... 381/29–40, 381/44–50

[56] References Cited

U.S. PATENT DOCUMENTS

| | | | |
|---|---|---|---|
| 3,321,582 | 5/1967 | Schroeder | 381/49 |
| 3,381,093 | 4/1968 | Flanagan | 381/31 |
| 4,057,690 | 11/1977 | Vagliani et al. | 381/46 |
| 4,181,813 | 1/1980 | Marley | 381/44 |
| 4,223,180 | 9/1980 | Eckels | 381/49 |
| 4,230,906 | 10/1980 | Davis | 381/38 |
| 4,270,025 | 5/1981 | Alsup et al. | 381/31 |
| 4,303,803 | 12/1981 | Yatsuzuka | 381/31 |
| 4,330,689 | 5/1982 | Kang et al. | 381/31 |
| 4,388,491 | 6/1983 | Ohta et al. | 381/49 |
| 4,419,657 | 12/1983 | Gagnon | 341/127 |
| 4,472,832 | 9/1984 | Atal et al. | 381/40 |
| 4,544,919 | 10/1985 | Gerson | 341/75 |
| 4,703,480 | 10/1987 | Westall et al. | 381/30 |

OTHER PUBLICATIONS

Silverman and Dixon, "A Parametrically Controlled Spectral Analysis System for Speech", IEEE on ASSP, vol. ASSP-22, No. 5, Oct. 1974, pp. 362-381.
B. S. Atal and M. R. Schroeder, "Adaptive Predictive Coding of Speech Signals", Bell Syst. Tech. J., vol. 49, pp. 1973-1986, Oct. 1970.
M. J. Sabin and R. M. Gray, "Product Code Vector Quantizers for Waveform and Voice Coding", IEEE Trans. on Acoust., Speech, and Signal Processing, vol. ASSP-32, pp. 474-488, Jun. 1984.
T. Tremain, "The Government Standard Adaptive Predictive Coding Algorithm", Speech Technology, pp. 52, 62, Feb. 1985.
M. M. Sondhi, "New Methods of Pitch Extraction", IEEE Trans. Audio and Electroacoustics, vol. AU-16, pp. 262-266, Jun. 1968.
L. R. Rabiner and R. W. Schafer, Digital Processing of Speech Signals, pp. 150-158, Prentice-Hall, Englewood Cliffs, N.J., 1978.
N. S. Jayant, "Adaptive Quantization with One Word Memory", Bell Syst. Tech. J., vol. 52, pp. 1119-1144, Sep. 1973.
M. Honda and F. Itakura, "Bit Allocation in Time and Frequency Domain for Predictive Coding of Speech", IEEE Trans. on Accoust., Speech and Signal Processing, vol. ASSP-32, pp. 465-473, Jun. 1984.
"A Monolithic Audio Spectrum Analyzer", by Lin, et al., IEEE Transactions on Acoustics, Speech, and Signal Processing, vol. ASSP-31, No. 1, Feb. 1983.

Primary Examiner—Gary V. Harkcom
Assistant Examiner—David D. Knepper
Attorney, Agent, or Firm—Jerry A. Miller

[57] ABSTRACT

Processing speech signals applicable to a variety of speech processing including narrowband, mediumband and wideband coding. The speech signal is modified by a normalization process using the envelope of the speech signal such that the modified signal will have more desirable characteristics as seen by the intended processing algorithm. The modification is achieved by a point-by-point division (normalization) of the signal by an amplitudes function, which is obtained from lowpass filtering the magnitude of the signal. Several examples of normalized signal are presented. Application to pitch detection and speech coding are described herein.

8 Claims, 4 Drawing Sheets

METHOD AND APPARATUS FOR PROCESSING SPEECH SIGNALS

This is a continuation of application Ser. No. 06/822,982 filed Jan. 24, 1986, now abandoned.

CROSS REFERENCE TO RELATED DOCUMENTS

The present invention is scheduled to be disclosed at the International Conference on Acoustics, Speech and Signal Processing, ICASP '86, in Tokyo, Japan, Apr. 7, 1986, in a paper entitled "Amplitude Normalization and Its Application To Speech Coding", by Jaswant R. Jain. This paper is included as Appendix I herewith, the content of which is incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

This invention relates generally to the field of speech processing. More particularly, this invention relates to a speech processing method and apparatus which utilizes a point-by-point normalization technique to allow for improved processing of speech during periods of short term and very short term variations in amplitude. These amplitude variations would normally not be accurately reproduced by frame or subframe oriented speech processing systems. The present invention has wide application in the speech processing field including the areas of coding and pitch detection.

2. Background of the Invention

The following references may be useful to the understanding of the present invention and are referenced by number throughout this specification.

REFERENCES

[1] B. S. Atal and M. R. Schroeder, "Adaptive Predictive Coding of Speech Signals", Bell Syst. Tech. J., Vol. 49, pp. 1973-1986, October 1970.

[2] M. J. Sabin and R. M. Gray, "Product Code Vector Quantizers for Waveform and Voice Coding", IEEE Trans. on Acoust., speech, and signal processing, Vol. ASSP-32, pp. 474-488, June 1984.

[3] T. Tremain, "The Government Standard Adaptive Predictive Coding Algorithm", Speech Technology, pp. 52-62, February 1985.

[4] M. M. Sondhi, "New Methods of Pitch Extraction", IEEE Trans. Audio and Electroacoustics, Vol AU-16, pp. 262-266, June 1968.

[5] L. R. Rabiner and R. W. Schafer, Digital Processing of Speech Signals, pp. 150-157, Prentice-Hall, Englewood Cliffs, N.J., 1978.

[6] N. S. Jayant, "Adaptive Quantization with One Word Memory", Bell Syst. Tech. J., Vol. 52, pp. 1119-1144, September 1973.

[7] M. Honda and F. Itakura, "Bit Allocation in Time and Frequency Domain for Predictive Coding of Speech", IEEE Trans. on Acoust., Speech, and Signal Processing, Vol. ASSP-32, pp. 465-473, June 1984.

Block-by-block normalization of speech waveforms is widely used in speech processing systems. Two examples are: (1) the APC method, [1] with a block (or frame) size 10-30 milliseconds, where the residual signal is normalized by gain; and (2) The shape-gain vector quantization (SGVQ), [2], with a block (or vector) size of 0.5-1 milli-seconds, where a vector is normalized by its r.m.s. value.

In the APC method, the normalization is done over the whole frame by a single gain value. This causes obvious problems when the amplitudes of the signal changes rapidly across the frame. A partial solution to the above problem is to find several gain values (scale factors) for each frame as in [3] where a block is divided into several sub-blocks. A similar sort of problem is also encountered in auto-correlation methods of pitch detection where center clipping is used tp avoid correlation peaks due to harmonic structure [4]-[5]. As will be shown later, these methods of center clipping do not achieve the intended goals in certain cases.

Jayant's backward-adaptive quantizer, [6], does an implicit point-by-point normalization of the signal being fed to the quantizer by predicting the signal amplitudes. However, this form of normalization is specifically suited to the quantization method and neither the normalizing function (stepsize) nor the normalized signal are useful for other purposes. The present invention utilizes a point-by-point amplitudes normalization method with a very wide applicability in many areas of speech processing, including coding.

None of the above techniques uses subrate sampling of the positive half of the envelope of the speech signal together with interpolation and normalization to more accurately reproduce or code the digitized speech as taught by the present invention.

SUMMARY OF THE INVENTION

It is an object of the present invention to provide an improved method and apparatus for processing speech.

It is another object of the present invention to provide a technique for achieving improved processing speech signals with a relatively low overhead.

It is another object of the present invention to provide a method for processing speech which provides for improved processing of speech in periods of significant short term or very short term amplitude variations.

It is a further object of the present invention to provide a speech processing method and apparatus which provides point-by-point normalization of a speech signal by utilizing the speech envelope as a normalizing function.

These objectives are accomplished by finding a smooth function which changes with the amplitudes of the signal. In the preferred embodiment, this smooth function takes the form of the upper half envelope of the speech signal, but those skilled in the art may recognize other functions which are appropriate. When a point-by-point division of the signal by this function is performed, the resulting waveform has fairly uniform amplitudes throughout. For purposes of the present document, those amplitudes variations which occur from pitch-to-pitch or frame-to-frame will be called short-term (ST) and those which occur within a pitch period will be called very-short-term (VST) or intra-pitch variations. The application and desired results will determine if a short-term or a very-short-term normalization is desirable. Therefore, the method of computing the amplitude function should be parameter selectable to yield the desired normalization rate in the preferred embodiment.

These and other objects of the invention will become apparent to those skilled in the art upon consideration of the following description of the invention.

In one embodiment of the present invention a method for processing a speech signal includes the steps of taking the absolute value of the speech signal and low pass filtering it to obtain a positive half-envelope function (Amplitude Function). This positive half-envelope function is then subrate sampled and values between the subrate samples are determined by interpolation to produce a replica of the amplitude. The speech signal is then normalized by this amplitude function and wide band coded.

In another embodiment of the present invention, an apparatus for processing a speech signal includes an input circuit for receiving a speech signal. A circuit is coupled to the speech input for converting the speech input signal to an amplitude function having characteristics of a positive (or negative) half-envelope of the speech signal. A normalizing circuit is coupled to the input circuit by dividing the speech signal by the amplitude function to effect a normalization of the speech signal.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 2a.1 shows a first example of an input signal of a signal with short term amplitude variation.

FIG. 2b.1 shows the amplitude function AF of the signal of FIG. 2a.1.

FIG. 2c.1 shows the normalized signal of FIG. 2a.1 as normalized by the AF of FIG. 2b.1.

FIG. 2a.2 shows a second example of an input signal of a signal with short term amplitude variation.

FIG. 2b.2 shows the amplitude function AF of the signal of FIG. 2a.2.

FIG. 2c.2 shows the normalized signal of FIG. 2a.2 as normalized by the AF of FIG. 2b.2.

FIG. 2a.3 shows a third example of an input signal of a signal with short term amplitude variation.

FIG. 2b.3 shows the amplitude function AF of the signal of FIG. 2a.1.

FIG. 2c.3 shows the normalized signal of FIG. 2a.3 as normalized by the AF of FIG. 2b.3.

FIG. 3a represents the input signal.

FIG. 3b represents the amplitude function AF.

FIG. 3c represents the signal of FIG. 3a normalized by the amplitude function of FIG. 3b.

FIG. 3d.1 represents the center clipped signal using the method of reference [4].

FIG. 3e.1 represents the autocorrelation derived from the center clipped signal of FIG. 3d.1.

FIG. 3d.2 represents the center clipped signal using the method of reference [5].

FIG. 3e.2 represents the autocorrelation derived from the center clipped signal of FIG. 3d.2.

FIG. 3d.3 represents the center clipped signal using the normalized signal.

FIG. 3e.3 represents the autocorrelation derived from the center clipped signal of FIG. 3d.3.

FIG. 4a.1 represents a first example of an input signal.

FIG. 4b.1 represents the step size from Jayant's 4 bit APCM applied to the signal of FIG. 4a.1.

FIG. 4c.1 represents the AF of the first example.

FIG. 4d.1 represents the normalized signal of the first example.

FIG. 4a.2 represents a first example of an input signal.

FIG. 4b.2 represents the step size from Jayant's 4 bit APCM applied to the signal of FIG. 4a.2.

FIG. 4c.2 represents the AF of the first example.

FIG. 4d.2 represents the normalized signal of the first example.

FIG. 4e is a histogram of the normalized signal.

DETAILED DESCRIPTION OF THE PREFERRED EMBODIMENT

Figure 1:
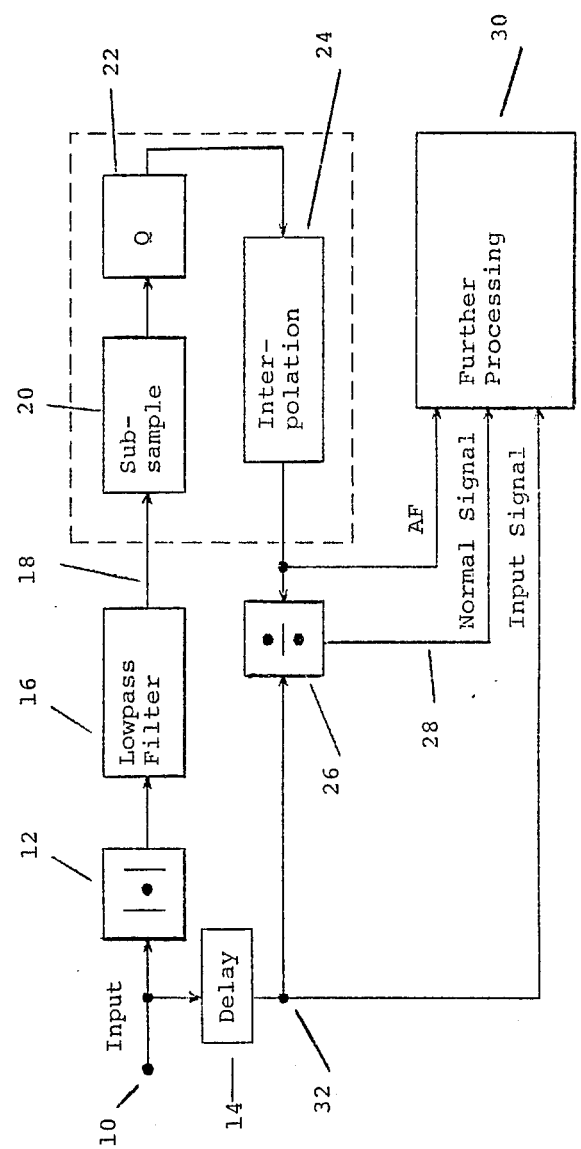
FIG. 1 is a Block diagram of the speech processing method and apparatus of the present invention.

Turning now to FIG. 1 a block diagram of the normalization method of the present invention is shown. In the preferred embodiment, the present invention is implemented by a programmed processor as will be appreciated by those skilled in the art. Therefore, the diagram of FIG. 1 may be thought of as both a functional block diagram and an operational flow diagram.

An input signal present at node 10 is applied to an absolute value block 12 as well as a delay block 14. The output of absolute value block 12 is applied to a lowpass filter 16 which removes higher frequency components to produce positive half-envelope signal at its output 18. The output signal at 18 is sampled at a subsampling block 20. The output of subsampler 20 is applied to a quantizer 22 where the signal is quantized to any of a predetermined number of quantization levels. In the preferred embodiment, only four or five bits of quantization are used but this is of course not to be limiting and depends greatly on the particular application at hand. The output of 22 is applied to an interpolation block 24. The output of the interpolation block is applied to a divider 26 which is used to divide the delayed output from delay 14 by the output of 24 to provide the normalized signal at node 28. The output of interpolator 24 is essentially a sampled envelope signal shown as AF in the figure and referred to herein as the Amplitude Function. This AF may be used by block 30 as well as the normalized signal at node 28 and the delayed input signal at node 32 in further processing.

The further processing shown in block 30 may take many forms as will be appreciated by those skilled in the art. For example, the speech data may be coded and assembled into a stream or frame of binary data by circuitry including, for example, an adaptive differential Pulse Code Modulation (ADPCM) Codes. This digital signal can then be transmitted, for example by modem, for receipt at a remote location. The remote receiver can then simply use the AF (the quantized, subrate sampled signal from 22 may be easily coded with low overhead) to reconstruct the input signal by denormalization (multiplication). Of course if the signal from 22 is transmitted rather than the replica of the AF, interpolation is also used at the receiver. In another example, coding and/or pitch detection can be part of the further processing. Those skilled in the art will recognize numerous variations in the application and implementation of the present invention.

In operation, the input signal at 10 is first processed by the absolute value circuit 12 to produce a signal at it's output having all positive values. Those skilled in the art will recognize that other equivalent operations may be substituted for this operation. For example, a half wave rectifier may be used to clip off the bottom (or top) half of the speech signal; or, the speech signal can be squared to remove the negative component and then the square root may be taken. In any event, the object is to detect the peak values in the input signal in preparation for low-pass filter 16. Low-pass filter 16 is used to smooth the signal to produce a signal resembling the positive half of an envelope of the speech signal (assuming symmetry of the speech signal). This signal at 18 is then sampled by a subrate sampler 20 operating at a rate substantially lower than the actual sampling rates required for sampling the speech signal itself, for example approximately 100 Hz for short term amplitude normalization (STAN) and approximately 1000 Hz for very short term amplitude normalization (VSTAN). In most speech applications, subrate sampling rates in the range of about 100 to 1000 Hz will be appropriate but this is not to be limiting. The output of the sampler is quantized at 22 and then passed on to 24. At 24, an interpolation process is carried out in order to create an Amplitude Function as described later. The interpolation process creates a point in the Amplitude Function for each sample of the input speech signal. This Amplitude Function is then divided point-by-point into the speech signal to effect a normalization of the speech signal.

In the preferred embodiment, low pass filtering is used for interpolation, simple linear interpolation may also be used to create points on the amplitude function in between the subrate samples to enhance computational efficiency. Other known interpolation and curve fitting techniques may prove advantageous in some applications.

Such normalization provides many advantages to some forms of further processing. Since the quantized amplitude signal is sampled at a low frequency, compared with the sampling rate for the speech signal transmission to a receiver involves incurring very little overhead while resulting in an enhanced accuracy in the reproduction of transient frames of speech. Further, the normalization process has significant advantages when applied to speech coding. Since the signal is normalized, the signal variation and thus the number of bits required to code the signal accurately is reduced resulting in a reduction in the bandwidth required for transmission.

The amplitudes function (AF) is preferably obtained by lowpass filtering of the absolute value of the input digital signal. The cut-off frequency of this filter determines the normalization rate. A 9-bit linear representation of the AF is adequate and thus the division can be very efficiently implemented by a table look-up. For those speech coding applications where the knowledge of the normalization function is required at the receiver, the amplitudes function is sampled at the Nyquist rate and quantized using 5-bit log-PCM. A reconstruction of the quantized AF is obtained both at the transmitter and the receiver by interpolation so that the same AF is used at both ends. If an explicit knowledge of the AF is not required at the receiver the blocks within the dotted lines may be bypassed. The amplitude normalized signal, the delayed input signal and the AF are then fed to the processing block. As will be demonstrated, certain parameters are better estimated from the normalized signal, others from the input signal and yet others from the renormalized version of a processed signal derived from the normalized signal.

For short-term amplitudes normalization (STAN), the cut-off frequency of the lowpass filter is set at 25–30 Hz in the preferred embodiment with the stop-band rejection at 50 Hz and the sampling rate at 100 Hz. For very-short-term amplitudes normalization (VSTAN), all the frequencies are preferably set at ten times the above values (approximately 250 to 300 Hz for the cut-off frequency, 500 Hz for the stop-band rejection) and 1000 Hz sampling rate. In other embodiments, other filter characteristics may be desirable but in general, the cutoff will usually lie somewhere within or between these ranges. Of course these quantities are merely intended to be illustrative and are not to be limiting as they will be largely determined by the application at hand. If the transmission of the AF is not required, an IIR filter (Infinite Impulse Response) can be used. Otherwise, an FIR filter (Finite Impulse Response) is preferred due to better computational efficiency in the decimation and interpolation process. The computation required for nomalization is nearly 10 operations per point, which would consume 2–5% of real-time on most DSPs.

The delay introduced for STAN is 10–20 milliseconds and for VSTAN it is 2–4 milliseconds. These delays are determined by and set approximately equal to the delay inherent in the low-pass filter and are therefore dependent upon the exact nature of the low-pass filter being used for any particular application. The delay allows the input signal to be properly normalized by the portion of the envelope created by that portion of the input signal so that a more accurate normalization occurs.

Figure 2:
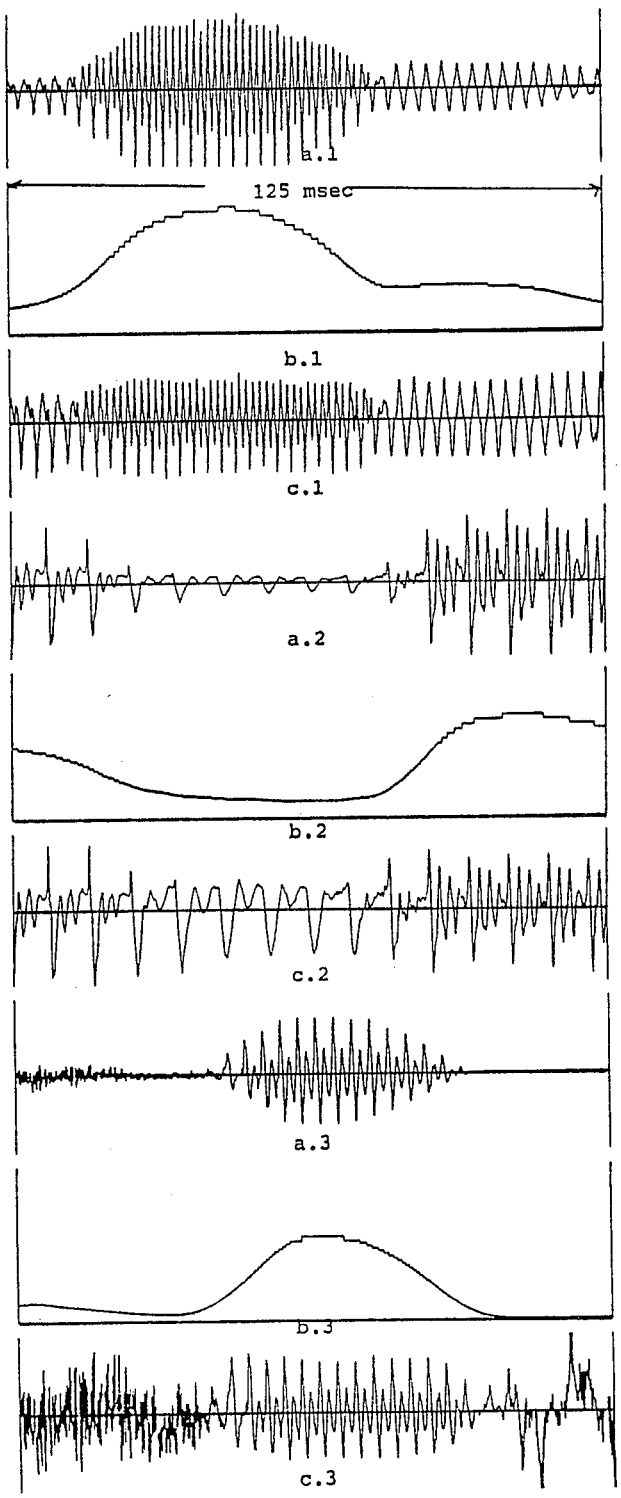
FIG. 2 in general shows three examples of normalization of signals with short term amplitude variation.

FIG. 2 shows three examples, as indicated by the digit following the period in the figure number (e.g. FIG. 2a.3 is part of the third example in FIG. 2) with figures sharing a common letter having a common property, representative of a variety of sort-term amplitudes normalization obtained through computer simulation of the present invention. It should be noted that the normalized signal has fairly uniform amplitudes throughout and that it has not altered the intrapitch characteristics for voiced sounds. It will be clear to those skilled in the art that the normalized signal has more desirable amplitude characteristics for pitch detection and quantization for APC but not in computation of prediction parameters. Example 3 shows a segment containing an unvoiced sound followed by a voiced sound of varying amplitudes followed by a silence. The 125 millisecond segment contains several frames worth of data. In the frames containing voicing transitions (part of the frame containing voiced sound and the remaining part containing unvoiced/silence) the autocorrelation, and hence the prediction parameters, computed from the normalized signal would have much greater influence of unvoiced/silence as compared with that computed from the input signal. This would result in a poorer prediction. Therefore, it is generally better to use the input (un-normalized) signal for computation of linear prediction parameters. For this reason, selective use of the normalized signal is used depending upon the actual embodiment.

Figure 3:
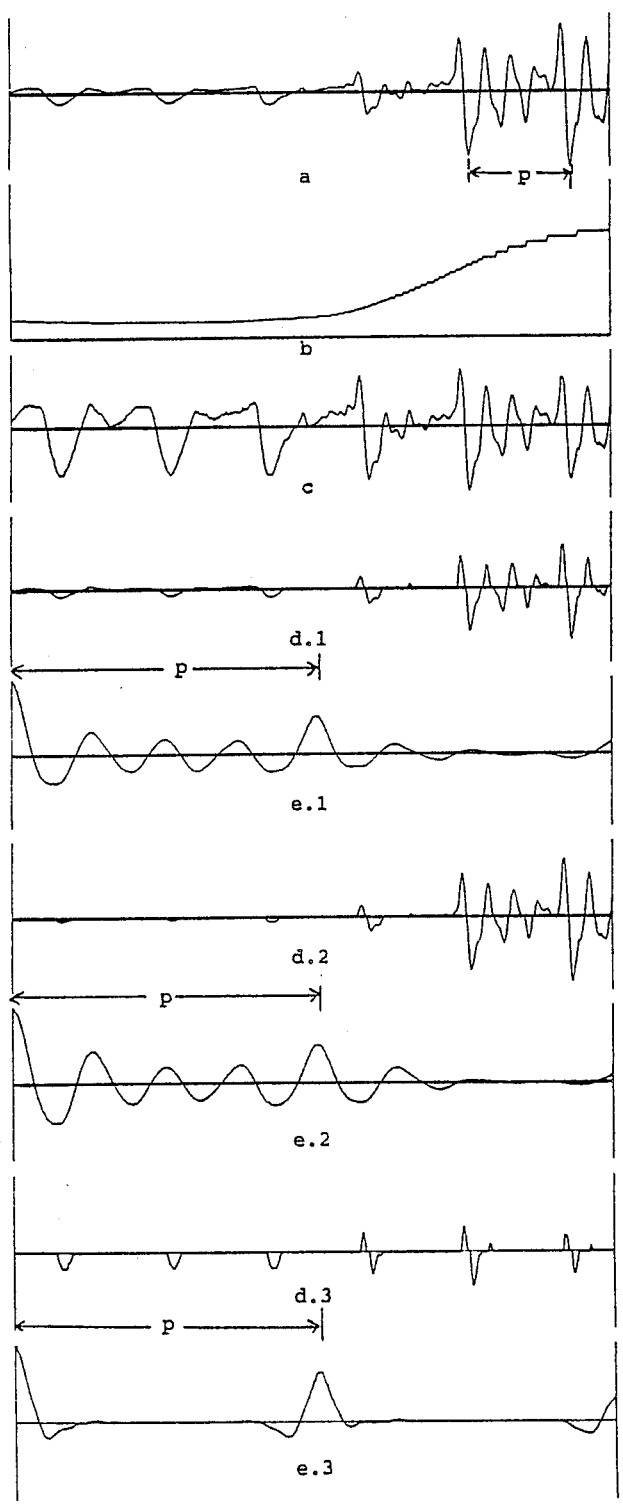
FIG. 3 in general shows three examples of the application of the present invention to the autocorrelation method of pitch detection.

The usefulness of the STAN in the autocorrelation method of pitch detection is evidenced by referring to FIG. 3. A voice segment with changing amplitudes is shown in FIG. 3a. The AF and the normalized signal are shown in FIG. 3b and 3c. As suggested in [4], center clipping the signal before computing the autocorrelation function is helpful in attenuating extraneous peaks caused by strong harmonics. At least three known methods of center clipping may be utilized in accordance with the present invention; (1) As suggesting in [4], divide the frame into 4 millisecond mini-frames. For each mini-frame, find the maximum absolute value and set the center clipping threshold at 30% of this value; (2) As suggest in [5], find maximum absolute value in the first third and last third of the frame and set the center clipping threshold at 64% of the minimum of the two values; (3) Use the amplitudes normalized signal for center clipping with the center clipping threshold st at 50% of the maximum absolute value.

Figures forming a part of FIG. 3 and containing 'd' and 'e' as part of their figure numbers show the center clipped waveforms and the autocorrelation function derived from them. Three methods are illustrated in FIG. 3 as designated by the number following the period in the figure number. The time scale for the autocorrelation function has been expanded three times for better resolution. For method 3, a re-normalized center clipped signal, obtained by multiplying the center lipped signal by th AF, is used for autocorrelation computation. It is clear from these figures that method 3 is most in eliminating the harmonic instruction and preserving the pitch peaks of the low level signal after center clipping. This success is reflected in the autocorrelation function for method 3, which is free of extraneous peaks that are present for methods 1 and 2.

Figure 4:
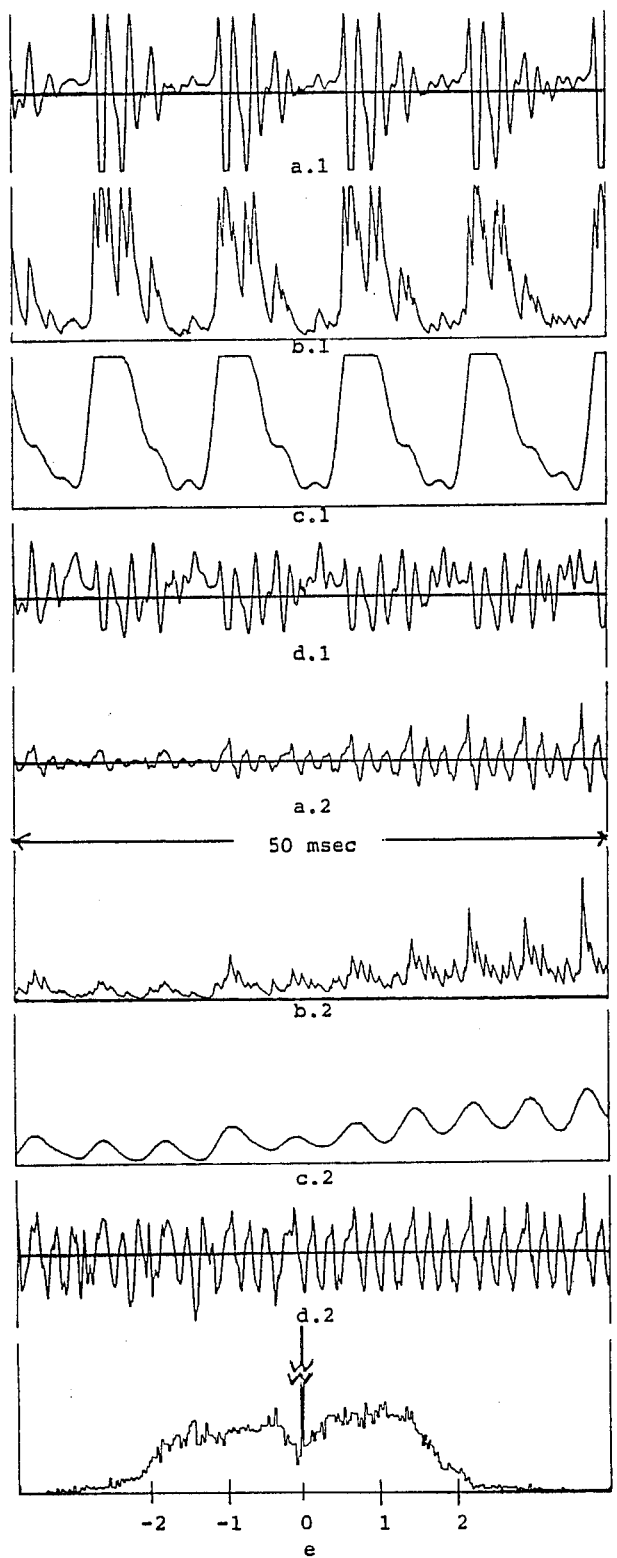
FIG. 4 in general shows two examples of very short term amplitude normalization in a wideband coding application.

FIG. 4 shows two examples, as designated by the number following the period in the figure number, of VSTAN and its application to wideband coding. In both examples, FIGS. 4a, 4b, 4c and 4d depict the input waveform, the stepsize adaption in Jayant's 4-bit APCM [6], the very-short-term amplitudes function and the normalized waveform, respectively. Those skilled in the art will recognize that the main difference in the normalized signals in FIGS. 3 and 4 is that the latter has also normalized the intra-pitch amplitudes variations. The normalized signal of FIG. 4 would be highly undesirable as an input to a pitch detector. On the other hand, it has very desirable amplitudes characteristics for a fixed step quantizer. An eleven level uniform quantizer (3.46 bits) gave quality very close to the 4-bit APCM. If the bit-rate required to transmit the amplitudes function is included, the two methods have nearly the same rate. However, if an adaptive bit-allocation in the time domain is used based on the knowledge of the AF, [7], while keeping the total number of bits in a frame (10-20 msec.) constant, the quality is better than the APCM. It should be noted that the APCM is relatively simpler and involves no coding delay. FIG. 4e shows a histogram of the normalized signal.

Thus, a point-by-point normalization of speech signal as a preprocessing technique to improve the subsequent processing is disclosed herein. An amplitude function, which is obtained by lowpass filtering the magnitude of the signal thereby producing a signal having a shape resembling half of the envelope of the speech signal, is used for normalization. The cut-off frequency of the lowpass filter plays a very important role in the properties of the normalized signal. Two types of normalization rates have been found to give desired amplitudes characteristics for different applications. The present invention may also provide improvements when combined with the vector quantization of the VST amplitude function and the normalized signal similar to that of [2].

The present invention is preferably implemented utilizing a programmed processor such as a microcomputer. The attached Appendix II is an exemplary Fortran implementation of the speech processor of the present invention. Appendix II is hereby incorporated by reference. Listing I of Appendix II is a software implementation of the absolute value circuit, the low pass filter and envelope generator according to the present invention. Listing one accepts an input file, takes the absolute value of each point in that file and uses routine DOTPR (a dot product routine) in conjunction with filter coefficients to effect a low pass filtering of the input file. The input file is then passed to routine AMPLTD which produces the amplitude function and places that in an output file.

Listing II of Appendix II uses the input file and the amplitude function file to produce the normalized signal. This normalized signal is applied to a two to one TDHS compressor to produce two to one compressed output. This two to one output is applied to an APC-AB quantizer and is then applied to a TDHS expander. The output of the TDHS expander is denormalized to produce reconstructed speech. Those skilled in the art will readily be able to adapt this Fortran implementation to fit their individual needs. The computer programs of Appendix II were written in Fortran 77 to run on a VAX 11-750 minicomputer using an AP-120B array processor.

Thus it is apparent that in accordance with the pesent invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

APPENDIX I

AMPLITUDE NORMALIZATION AND ITS APPLICATION TO SPEECH CODING

Jaswant R. Jain

Racal-Milgo, Inc.
P. O. Box 407044, MS E204
Fort Lauderdale, FL 33340

ABSTRACT

A new method of processing speech signals has been introduced which is applicable to a variety of speech processing including narrowband, mediumband and wideband coding. It modifies the speech signal such that the modified signal will have more desirable characteristics as seen by the intended processing algorithm. The modification is achieved by a point-by-point division (normalization) of the signal by an amplitude function, which is obtained from lowpass filtering the magnitude of the signal. Several examples of normalized signal are presented. Applications to pitch detection and speech coding have been described. We mention several areas for future research.

I. INTRODUCTION

A block-by-block normalization of speech waveform is widely used in coding. Two examples are: 1) The APC method, [1], with a block (or frame) size of 10-30 milliseconds, where the residual signal is normalized by gain; and 2) The shape-gain vector quantization (SGVQ), [2], with a block (or vector) size of .5 - 1 milliseconds, where a vector is normalized by its r.m.s. value.

In the APC method, the normalization of the whole frame by a single gain value causes obvious problems when the amplitude of the signal changes rapidly across the frame. One way to solve the above problem is to find several gain values (scale factors) for each frame as in [3] where a block is divided into several sub-blocks. A similar sort of problem is also encountered in autocorrelation method of pitch detection where center clipping is used to avoid correlation peaks due to harmonic structure [4]-[5]. As we will show later, the proposed methods of center clipping do not achieve the intended goals in certain cases.

Jayant's backward-adaptive quantizer, [6], does an implicit point-by-point normalization of the signal being fed to the quantizer by predicting the signal amplitude. However, this form of normalization is specifically suited to the quantization method and neither the normalizing function (stepsize) nor the normalized signal are of much use for other purposes. We propose a point-by-point amplitude normalization method with a very wide applicability in many areas of speech processing, including coding.

II. AMPLITUDE NORMALIZATION METHOD

Our objective was to find a smooth function which would change with the amplitude of the signal and when a point-by-point division of the signal by this function is performed the resulting waveform would have fairly uniform amplitude throughout. Those amplitude variations which occur form pitch-to-pitch or frame-to-frame would be called short-term (ST) and those which occur within a pitch period would be called very-short-term (VST) or intra-pitch variations. The application would determine if a short-term or a very-short-term normalization is desirable. Therefore, the method of computing the amplitude function should be parameter selectable to yield the desired normalization rate.

Figure 1 shows the block diagram of the normalization method. The amplitude function (AF) is obtained by lowpass filtering of the absolute value of the input digital signal. The cut-off frequency of this filter determines the normalization rate. A 9-bit linear representation of the AF is adequate and thus the division can be very efficiently implemented by a table look-up. For those speech coding applications where the knowledge of the normalization function is required at the receiver, the amplitude function is sampled at the Nyquist rate and quantized using 5-bit log-PCM. A reconstruction of the quantized AF is obtained both at the transmitter and the receiver by interpolation so that the same AF is used at both ends. If an explicit knowledge of the AF is not required at the receiver the blocks within the dotted lines are bypassed. The amplitude normalized signal, the input signal and the AF are then fed to the processing block. As we will demonstrate in the next section, certain parameters are better estimated from the normalized signal, others from the input signal and yet others from the renormalized version of a processed signal derived from the normalized signal.

For short-term amplitude normalization (STAN), the cut-off frequency of the lowpass filter is set at 25-30 Hz with the stop-band rejection at 50 Hz and the sampling rate at 100 Hz. For very-short-term amplitude normalization (VSTAN), all the frequencies are set at ten times the above values. If the transmission of the AF is not required, an IIR filter can be used. Otherwise, an FIR filter would save computations in the decimation and interpolation process. The computation required for normalization is nearly 10 operations per point, which would consume 2-5% of real-time on most DSPs. The delay introduced for STAN is 10-20 milliseconds and for VSTAN it is 2-4 milliseconds.

III. EXPERIMENTAL RESULTS

Figure 2 shows three examples, representative of a variety of short-term amplitude normalization. Note that the normalized signal has fairly uniform amplitude throughout and that it has not altered the intra-pitch characteristics for voiced sounds. It is easy to see that the normalized signal has more desirable amplitude characteristics for pitch detection and quantization for APC but not in computation of prediction parameters. Example 3 shows a segment containing an unvoiced sound followed by a voiced sound of varying amplitude followed by a silence. The 125 millisecond segment contains several frames worth of data. In the frames containing voicing transitions (part of the frame containing voiced sound and the remaining part containing unvoiced/silence) the autocorrelation, and hence the prediction parameters, computed from the normalized signal would have much greater influence of unvoiced/silence as compared with that computed from the input signal. This would result in a poorer prediction. Therefore, it is better to use the input (un-normalized) signal for computation of linear prediction parameters. That is why we recommend selective use of the normalized signal.

We will demonstrate the usefulness of the STAN in autocorrelation method of pitch detection by referring to Figure 3. A voice segment with changing amplitude is shown in Figure 3a. The AF and the normalized signal are shown in Figures 3b and 3c. As suggested in [4], center clipping the signal before computing the autocorrelation function is helpful in attenuating extraneous peaks caused by strong harmonics. We will compare the following three methods of center clipping: (1) As suggested in [4], divide the frame into 5 millisecond mini-frames. For each mini-frame, find the maximum absolute value and set the center clipping threshold at 30% of this value; (2) As suggested in [5], find maximum absolute value in the first third and the last third of the frame and set the center clipping threshold at 64% of the minimum of the two values; (3) Use the amplitude normalized signal for center clipping with the center clipping threshold set at 50% of the maximum absolute value.

Figures 3d and 3e show the center clipped waveforms and the autocorrelation function derived from them. The time scale for the autocorrelation function has been expanded three times for better resolution. For method 3, a re-normalized center clipped signal, obtained by multiplying the center clipped signal by the AF, is used for autocorrelation computation. It is clear from these figures that method 3 has succeeded the most in eliminating the harmonic structure and preserving the pitch peaks of the low level signal after center clipping. This success is reflected in the autocorrelation function for method 3, which is free of extraneous peaks that are present for methods 1 and 2.

Figure 4 shows two examples of VSTAN and its application to wideband coding. Figures 4a, 4b, 4c and 4d depict the input waveform, the stepsize adaptation in Jayant's 4-bit APCM [6], the very-short-term amplitude function and the normalized waveform, respectively. Note the main difference in the normalized signals in Figures 3 and 4, the latter has also normalized the intra-pitch amplitude variations. The normalized signal of Figure 4 would be highly undesirable as an input to a pitch detector. On the other hand, it has very desirable amplitude characteristics for a fixed step quantizer. An eleven level uniform quantizer (3.46 bits) gave quality very close to the 4-bit APCM. If we include the bit-rate required to transmit the amplitude function, the two methods have nearly the same rate. However, if an adaptive bit-allocation in the time domain is used based on the knowledge of the AF, [7], while keeping the total number of bits in a frame (10-20 msec.) constant, the quality is better than the APCM. We note that the APCM is relatively simpler and involves no coding delay. Figure 4e shows a histogram of the normalized signal.

IV. AREAS FOR FUTURE RESEARCH

We have illustrated the concept of amplitude normalization by giving examples of pitch detection and wideband coding. However, a complete investigation and comparison with existing methods are areas for future research. Vector quantization of the VST amplitude function and the normalized signal along the lines of [2] is another area which shows promise. Use of STAN in LPC and APC rather than the gain is another area with potential for improvement in quality. Usefulness to speech recognition remains to be seen.

V. SUMMARY AND CONCLUSIONS

We have proposed a point-by-point normalization of speech signal as a preprocessing technique to improve the subsequent processing. An amplitude function, which is obtained by lowpass filtering the magnitude of the signal, is used for normalization. The cut-off frequency of the lowpass filter plays a very important role in the properties of the normalized signal. Two types of normalization rates have been found to give desired amplitude characteristics for different applications. Examples of pitch detection and wideband coding are given. Several areas for future research are suggested.

REFERENCES

[1] B. S. Atal and M. R. Schroeder, "Adaptive predictive coding of speech signals", Bell Syst. Tech. J., vol. 49, pp. 1973-1986, Oct. 1970.
[2] M. J. Sabin and R. M. Gray, "Product code vector quantizers for waveform and voice coding", IEEE Trans. on Acoust., speech, and signal processing, vol. ASSP-32, pp. 474-488, June 1984.
[3] T. Tremain, "The government standard adaptive predictive coding algorithm", Speech Technology, pp. 52-62, February 1985.
[4] M. M. Sondhi, "New methods of pitch extraction", IEEE Trans. Audio and Electroacoustics, vol. AU-16, pp. 262-266, June 1968.
[5] L. R. Rabiner and R. W. Schafer, Digital processing of speech signals , pp. 150-157, Prentice-Hall, Englewood Cliffs, N. J., 1978.
[6] N. S. Jayant, "Adaptive quantization with one word memory", Bell Syst. Tech. J., vol. 52, pp. 1119-1144, September 1973.
[7] M. Honda and F. Itakura, "Bit allocation in time and frequency domain for predictive coding of speech", IEEE Trans. on Acoust., Speech, and Signal Processing, vol. ASSP-32, pp. 465-473, June 1984.

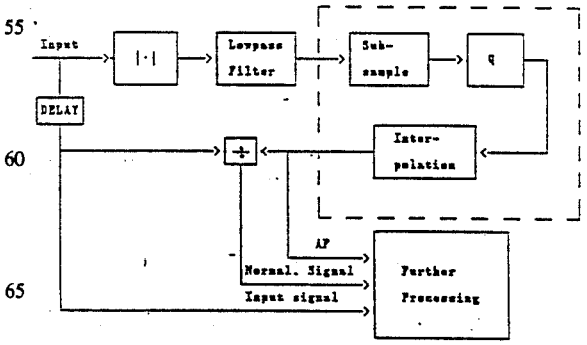

Fig. 1. Amplitude normalization method.

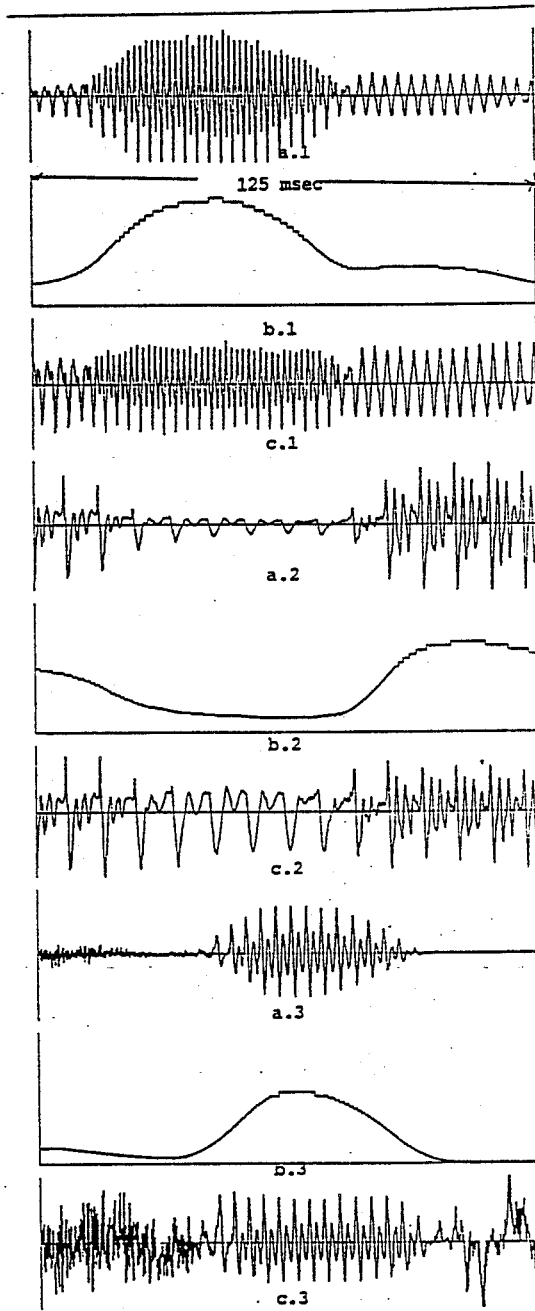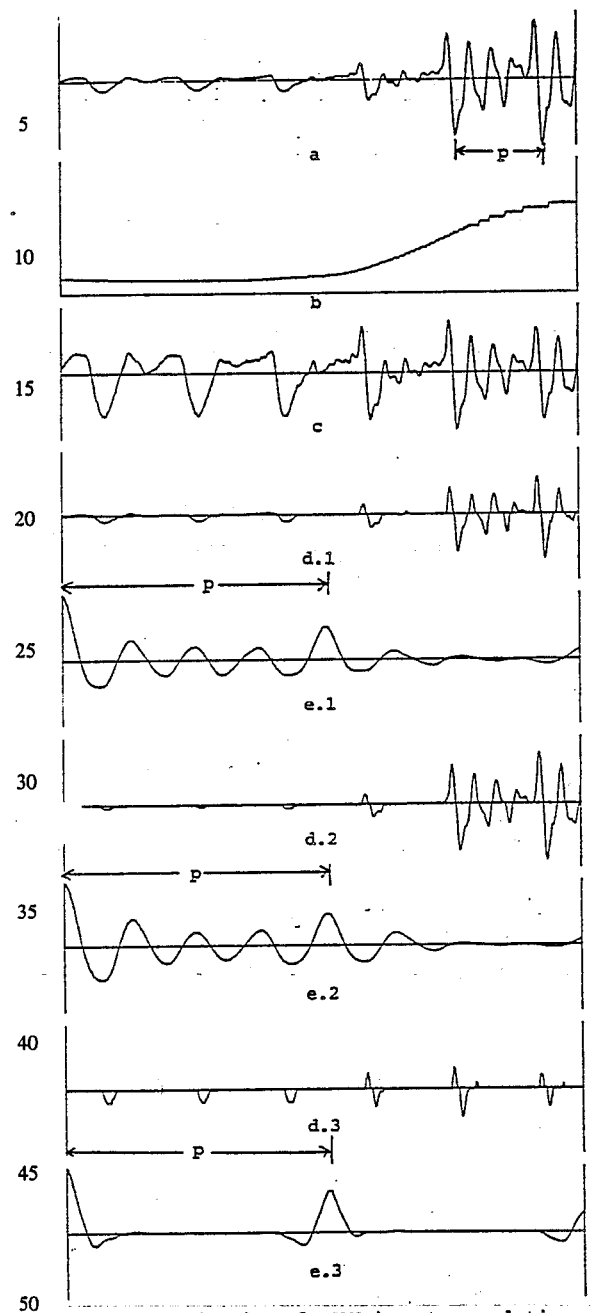

Fig. 2. Examples of short-term normalization.
a) Input signal; b) Amplitude function;
c) Normalized signal.

Fig. 3. Application of STAN in autocorrelation method of pitch detection. a) Input signal; b) Amplitude function; c) Normalized signal; d) Center clipped signal: (1) using method in [4], (2) using method in [5]; and (3) using normalized signal; e) Auto correlation derived from center clipped signal. NOTE: The time scale for autocorrelation is 3 times that of the signal.

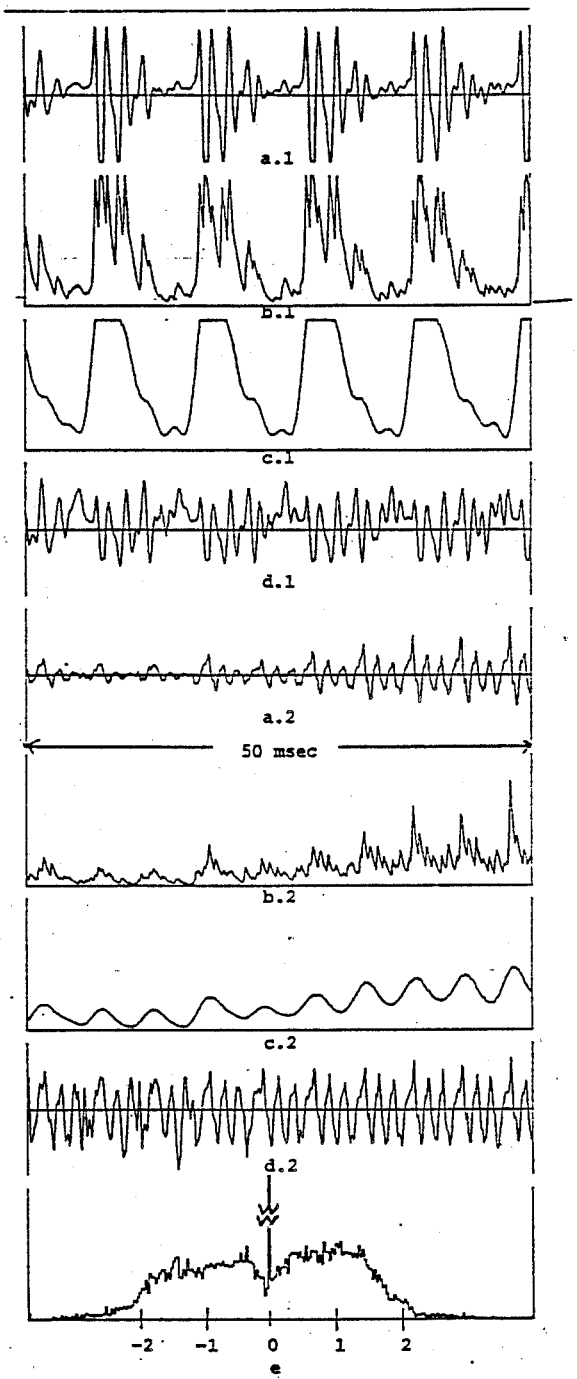
Fig. 4. Very-short-term amplitude normalization and its application in wideband coding. a) Input signal; b) Step-size from Jayant's 4-bit APCM; c) Amplitude function; d) Normalized signal; e) Histogram of the normalized signal.

APPENDIX II

COMPUTER LISTINGS

LISTING I

```
C
      BYTE INFIL(32),AMPFIL(32),AMOFIL(32)
      BYTE A(90)
      COMMON /SRCBLK/FLTH(181),DAT(180),AMP(180),AMO(180),AONT(6),
     1 LUN1,LUN2,LUN3,LREC,IFLTH,IDAT,JDAT,IAMP,JAMP,LFRM
C
      DATA LUN1,LUN2,LUN3,LREC,LFRM/1,2,3,90,180/
C
C     THE FOLLOWING FILTER COEFF. ARE SCALED UP BY 1000.
C
      DATA FLTH/.111093,.235784,.363024,.492751,.624899,.759402,
     1     .89619,1.035191,1.17633,1.319533,1.464721,1.611813,
     2     1.760727,1.911379,2.063684,2.217552,2.372896,2.529623,
     3     2.687642,2.846857,3.007173,3.168493,3.330718,3.493749,
     4     3.657486,3.821826,3.986667,4.151904,4.317435,4.483152,
     5     4.648951,4.814725,4.980367,5.145769,5.310823,5.475424,
     6     5.639461,5.802827,5.965414,6.127114,6.287819,6.447422,
     7     6.605816,6.762894,6.918551,7.072680,7.225178,7.375941,
     8     7.524865,7.671850,7.816793,7.959597,8.100161,8.238390,
     9     8.374188,8.507459,8.638113,8.766058,8.891205,9.013466,
     A     9.132757,9.248992,9.362091,9.471975,9.578566,9.681789,
     B     09.781572,09.877843,09.970533,10.059579,10.144918,
     C     10.226487,10.304230,10.378091,10.448017,10.513960,
     D     10.575870,10.633706,10.687425,10.736989,10.782363,
     E     10.823514,10.860412,10.893032,10.921351,10.945346,
     F     10.965003,10.980306,10.991244,10.997811,11.0,90*0./
      IEND = 0
      IFLTH = 100
      IDAT = IFLTH + 181
      JDAT = IDAT + 180
      IAMP = JDAT + 180
      JAMP = IAMP + 180
      ISCART = JAMP + 180
C
      CALL APINIT(0,0,ISTAT)
      TYPE *,' INPUT FILE ( *.D6K)'
      ACCEPT 105,LEN,INFIL
105   FORMAT(Q,32A1)
      INFIL(LEN+1)=0
      DO 12 K=1,LEN-3
      AMOFIL(K)=INFIL(K)
12    AMPFIL(K)=INFIL(K)
      AMPFIL(LEN-2)='A'
      AMPFIL(LEN-1)=INFIL(LEN-1)
      AMPFIL(LEN)=INFIL(LEN)
      AMPFIL(LEN+1)=0
      AMOFIL(LEN-2)='A'
      AMOFIL(LEN-1)='M'
      AMOFIL(LEN)='O'
      AMOFIL(LEN+1)=0
      OPEN(UNIT=LUN1,FILE=INFIL,STATUS='OLD',RECORDSIZE=90)
      OPEN(UNIT=LUN2,FILE=AMPFIL,TYPE='NEW',FORM='UNFORMATTED',
     1     RECORDSIZE=90)
      OPEN(UNIT=LUN3,FILE=AMOFIL,TYPE='NEW',RECORDSIZE=90)
C
C
      CALL VCLR(0,1,3000)
      CALL INITLZ
      DO 8000 IFRAME=1,10000
      CALL AMPLTD
      IF(IEND.NE.0) GO TO 999
8000  CONTINUE
C
999   STOP
      END
C
C     FUNCTION TO CONVERT FROM MU-LAW TO LINEAR
C
      INTEGER FUNCTION AL2LNR(IC)
      IC=IEOR(IC,"125)
      ISIGN=1
      IF(IAND(IC,"200).NE.0) ISIGN=-1
      IEXP=IAND(IC,"160)/16
      IC=IAND(IC,"17)
      IF(IEXP.EQ.0) GO TO 20
      IC=ISHFT(IC+16,IEXP-1)
20    AL2LNR=IC*ISIGN
      RETURN
      END
```

```
C
C       INITIALIZATION ROUTINE
C
        SUBROUTINE INITLZ
        BYTE A(90)
        COMMON /SRCBLK/FLTM(181),DAT(180),AMP(180),AMO(180),AQNT(6),
     1  LUN1,LUN2,LUN3,LREC,IFLTM,IDAT,JDAT,IAMP,JAMP,LFRM
C
C               SCALE AND MAKE SYMMETRIC COPY OF THE FILTER
C
        FLTM(91) = FLTM(91)*.001
        DO 10 I=1,90
        FLTM(I) = FLTM(I)*.001
   10   FLTM(182-I) = FLTM(I)
C
C               PUT FILTER INTO ARRAY PROC. MEMORY
C
        CALL APPUT(FLTM,IFLTM,181,2)
        CALL APWAIT
        RETURN
        END
C
        SUBROUTINE AMPLTD
        BYTE A(90),C
        INTEGER AL2LNR
        EQUIVALENCE (C,IC)
        COMMON /SRCBLK/FLTM(181),DAT(180),AMP(180),AMO(180),AQNT(6),
     1  LUN1,LUN2,LUN3,LREC,IFLTM,IDAT,JDAT,IAMP,JAMP,LFRM
        DIMENSION DATABS(180)
C
C               READ TWO RECORDS AND CONVERT FROM LOG TO LINEAR
C
        IBASE = 0
        DO 100 IREC = 1,2
        READ(LUN1,101,END=999) A
        DO 20 J=1,LREC
        C = A(J)
        DAT(IBASE+J) = AL2LNR(IC)
   20   DATABS(IBASE+J) = ABS(DAT(IBASE+J))
  100   IBASE = IBASE + LREC
  101   FORMAT(90A1)
C
C               PUT 6 K HZ DATA INTO ARRAY PROCESSOR MEMORY
C
        CALL APPUT(DATABS,JDAT,LFRM,2)
        CALL APWAIT
C
C               DO LOWPASS FILTERING
C
        DO 200 J=0,LFRM-1
        CALL DOTPR(IFLTM,1,IDAT+J,1,JAMP+J,181)
  200   CONTINUE
C
C               GET THE RESULTING 6 KHz DATA FORM ARRAY PROC. MEMORY.
C
        CALL APGET(AMP,JAMP,LFRM,2)
        CALL APWD
C
C               MOVE ONE FRAME TO THE LEFT
C
        CALL VMOV(JDAT,1,IDAT,1,LFRM)
        CALL APWAIT
        TYPE *,'                    DATA:'
        TYPE 102,(DAT(I),I=1,24)
        TYPE *,'                    AMPLITUDE:'
        TYPE 102,(AMP(I+90),I=1,24)
  102   FORMAT(1X,8F9.1)
C
C               MAKE DATA TO BE WITHIN RANGE
C
        DO 220 J=1,LFRM
  220   IF(AMP(J) .LT. 2.) AMP(J) = 2.
        WRITE(LUN2) (AMP(J),J=1,90)
        WRITE(LUN2) (AMP(J),J=91,180)
        RETURN
  999   IEND = 1
        RETURN
        END
C
C       CONVERT FROM LINEAR TO A-LAW
C
        FUNCTION LNR2AL(ICC)
        ISIGN=0
        IF(ICC .LT. 0) ISIGN="200
```

```
              ICC = IABS(ICC)
              KTH = 16
              DO 60 K=0,6
              IF(ICC .LT. KTH) GO TO 61
       60     KTH = KTH+KTH
       61     IF(K .EQ. 0) GO TO 62
              ICC = (ICC-KTH/2)/2**(K-1)
       62     ICC = ICC+K*16+ISIGN
              LNR2AL = IEOR(ICC,"125)
              RETURN
              END
```

.COPYRIGHT (C) 1986
RACAL MILGO
ALL RIGHTS RESERVED

ATK UNPUBLISHED WORK

LISTING II

```
C
              BYTE INFIL(32),AMPFIL(32),OUTFIL(32)
              BYTE A(90)
              DIMENSION CONST(100),IHISTO(256)
              COMMON /APMEM/AP(10000)
              COMMON /BLK/DAT(180),AMP(180),LUN1,LUN2,LUN3,LREC,IDAT,JDAT,
            1 IAMP,JAMP,LFRM,LASTFR,IDIF,MSE,IPLEN(64),IFLEN(64),IPVAL(64),
            2 MINPIT,MINPIT,LPIT3,LPIT2,LPIT1,MAXPIT,MAXPIT1,IPNORM,ICMP
              COMMON /APCBLK/NC,NC1,NRE,NRBITS,IRCADR,IAADR,IALADR,
            1 IRADR,IERADR,SP(188),SPO(188),RES(195)
              DATA NC,NRE,NRBITS/8,6,24/
              DATA LUN1,LUN2,LUN3,LREC,LFRM/1,2,3,90,180/
              DATA MINPIT,LPIT3,LPIT2,LPIT1,MAXPIT/16,23,45,68,90/
              CBITS = 0.
              CSAMPL = 0.
              IEND = 0
              ICONST = 0
              IDAT = 100
              JDAT = IDAT + 180
              IAMP = JDAT + 180
              JAMP = IAMP + 180
              IDIF = JAMP + 180
              MSE = IDIF + 135
              IPNORM = MSE + 64
              ICMP = IPNORM + 64
              IRCADR = ICMP + 180
              IAADR = IRCADR + 8
              IALADR = IAADR + 9
              IRADR = IALADR + 9
              IERADR = IRADR + 9
              INEXT = IERADR + 1
              CONST(1) = 1.
              CONST(2) = .5
              CONST(3) = 256.
              DO 2 I=1,256
       2      IHISTO(I) = 0
C
              CALL APINIT(0,0,ISTAT)
              TYPE *, ' INPUT FILE ( *.D6K)'
              ACCEPT 105,LEN,INFIL
              TYPE *,'       ITDHS,IQNT,INS,NRBITS = '
              ACCEPT *,ITDHS,IQNT,INS,NRBITS
       105    FORMAT(Q,32A1)
              INFIL(LEN+1)=0
              DO 12 K=1,LEN-3
              OUTFIL(K)=INFIL(K)
       12     AMPFIL(K)=INFIL(K)
              AMPFIL(LEN-2)='A'
              AMPFIL(LEN-1)=INFIL(LEN-1)
              AMPFIL(LEN)=INFIL(LEN)
              AMPFIL(LEN+1)=0
              OUTFIL(LEN-2)='E'
              IF(IQNT .EQ. 1) OUTFIL(LEN-2) = 'Q'
              IF(IQNT .EQ. 2) OUTFIL(LEN-2) = 'R'
              IF(IQNT .EQ. 0) OUTFIL(LEN-2) = 'T'
              IF(IQNT.EQ.0 .AND. ITDHS.EQ.0) OUTFIL(LEN-2)='O'
              OUTFIL(LEN-1)=INFIL(LEN-1)
              OUTFIL(LEN)=INFIL(LEN)
              OUTFIL(LEN+1)=0
              OPEN(UNIT=LUN1,FILE=INFIL,STATUS='OLD',RECORDSIZE=90)
```

```
        OPEN(UNIT=LUN2,FILE=AMPFIL,TYPE='OLD',FORM='UNFORMATTED',
     1          RECORDSIZE=90)
        OPEN(UNIT=LUN3,FILE=OUTFIL,TYPE='NEW',RECORDSIZE=90)
C
        CALL VCLR(0,1,3000)
        CALL APPUT(CONST,ICONST,100,2)
        CALL INITLZ
        IFRAME = 0
        DO 8000 IREC=1,10000,2
        CALL GETNOR(JDAT,JAMP,IEND)
        IF(IEND .NE. 0) GO TO 999
7000    IFRAME = IFRAME +1
        IF(IFRAME .GT. 175) GO TO 999
        CALL TDHSCE(ITDHS,IONT,INS,NEXP,NBITS,BITRAT)
        IF(IONT .NE. 2) GO TO 7500
        CBITS = CBITS + NBITS
        CSAMPL = CSAMPL + NEXP
        K = (BITRAT - 1.)*80.
        K = MIN0(256,MAX0(1,K))
        IHISTO(K) = IHISTO(K) + 1
7500    TYPE *,'      FRAME #, =',IFRAME
        IF(LASTFR .LT. LFRM) GO TO 7000
        LASTFR = LASTFR - LFRM
        CALL PUTNOR(IDAT,IAMP,IHISTO)
        CALL VMOV(JDAT,1,IDAT,1,LFRM)
        CALL APWAIT
        CALL VMOV(JAMP,1,IAMP,1,LFRM)
        CALL APWAIT
8000    CONTINUE
C
999     TYPE 1001,(IHISTO(I),I=1,256)
        BITRAT = CBITS/CSAMPL
        TYPE *,'      AVERAGE BIT-RATE = ',BITRAT
1001    FORMAT(10X,8I8)
        STOP
        END
C
C               TDHS COMPRESSION AND EXPANSION
C
        SUBROUTINE TDHSCE(ITDHS,IONT,INS,NEXP,NBITS,BITRAT)
        COMMON /APMEM/AP(10000)
        COMMON /BLK/DAT(180),AMP(180),LUN1,LUN2,LUN3,LREC,IDAT,JDAT,
     1  IAMP,JAMP,LFRM,LASTFR,IDIF,MSE,IPLEN(64),IFLEN(64),IPVAL(64),
     2  MINPT1,MINPIT,LPIT3,LPIT2,LPIT1,MAXPIT,MAXPT1,IPNORM,ICMP
C
C               FIND PITCH
C
        DO 100 IP = 1,64
C               FIND DIFFERENCE SIGNAL
        CALL VSUB(IDAT+LASTFR,1,IDAT+LASTFR+IPVAL(IP),1,IDIF,
     1           1,IPLEN(IP))
        CALL APWAIT
C               GET SUM OF SQUARES OF THE DIFF. SIGNAL
        CALL SVESQ(IDIF,1,MSE+IP-1,IPLEN(IP))
        CALL APWAIT
100     CONTINUE
C               GET MSE
        CALL VMUL(MSE,1,IPNORM,1,MSE,1,64)
        CALL APWAIT
C               FIND MINIMUM OF MSE

CALL XMINV(MSE,1,90,64)
        CALL APGET(RMSMIN,90,1,2)
        CALL APGET(RJPIT,91,1,2)
        JPIT = IFIX(RJPIT)
        CALL APWD
        IPIT = IPVAL(JPIT)
        CALL XMAXV(MSE,1,90,64)
        CALL APGET(RMSMAX,90,1,2)
        TYPE *,' MIN. MSE,MAX. MSE,PITCH = ',RMSMIN,RMSMAX,IPIT
        IF(ITDHS .EQ. 0) GO TO 160
C
C               PERFORM TDHS COMPRESSION
C
        IPIT2 = IPIT/2
        NCMP = 0
        NEXP = 0
        NPIT = 0
150     ISTART = LASTFR+IDAT+NEXP
        IASTRT = IAMP + LASTFR + NEXP + IPIT2
        CALL VADD(IASTRT,1,IASTRT+IPIT,1,92,1,1)
        CALL VDIV(92,1,IASTRT,1,93,1,1)
        CALL VDIV(92,1,IASTRT+IPIT,1,94,1,1)
```

```
        CALL VSMUL(ISTART,1,93,ISTART,1,IPIT)
        CALL VSMUL(ISTART+IPIT,1,94,ISTART+IPIT,1,IPIT)
        CALL VADD(ISTART,1,ISTART+IPIT,1,ICMP+NCMP,1,IPIT)
        NCMP = NCMP + IPIT
        NEXP = 2*NCMP
        NPIT = NPIT + 1
        IF(NEXP .NE. IFLEN(JPIT)) GO TO 150
        GO TO 240
  160   NCMP = IFLEN(JPIT)
        NEXP = NCMP
        NPIT = NCMP/IPIT
        CALL VMOV(IDAT+LASTFR,1,ICMP,1,NCMP)
C
C           QUANTIZE COMPRESSED WAVEFORM USING APC-AB
C
  240   IF(IQNT.EQ.1) CALL APCAB(NCMP,NEXP,IPIT,NPIT,IQNT,INS,IFRAME)
        IF(IQNT.EQ.2) CALL APCEC(NCMP,NEXP,INS,NBITS,BITRAT)
C
C               PERFORM TDHS EXPANSION
C
        IF(ITDHS .EQ. 0) GO TO 260
        NCMP = 0
        NEXP = 0
  250   ISTART = LASTFR+IDAT+NEXP
        CALL VSMUL(ICMP+NCMP,1,1,ISTART,1,IPIT)
        CALL VMOV(ICMP+NCMP,1,ISTART,1,IPIT)
        CALL APWAIT
        CALL VMOV(ISTART,1,ISTART+IPIT,1,IPIT)
        NCMP = NCMP + IPIT
        NEXP = 2*NCMP
        IF(NEXP .NE. IFLEN(JPIT)) GO TO 250
        GO TO 270
  260   CALL VMOV(ICMP,1,IDAT+LASTFR,1,NEXP)
C
  270   LASTFR = LASTFR + NEXP
        RETURN
        END
C

C           ROUTINE APC-AB
C
        SUBROUTINE APCAB(N,NEXP,IPIT,NPIT,IQNT,INS,IFRAME)
        COMMON /APMEM/AP(10000)
        COMMON /BLK/DAT(180),AMP(180),LUN1,LUN2,LUN3,LREC,IDAT,JDAT,
       1  IAMP,JAMP,LFRM,LASTFR,IDIF,MSE,IPLEN(64),IFLEN(64),IPVAL(64),
       2  MINPT1,MINPIT,LPIT3,LPIT2,LPIT1,MAXPIT,MAXPT1,IPNORM,ICMP
        COMMON /APCBLK/NC,NC1,NRE,NRBITS,IRCADR,IAADR,IALADR,
       1  IRADR,IERADR,SP(188),SPQ(188),RES(195)
        COMMON /AUTPAR/RC(8),A(9),AL(9),R(9)
        DIMENSION ABSRES(195),ABIN(13),NBIN(13),LOCBIN(14),IBIT(13)
        DIMENSION Q(2),B(2),RHO(3)
        DATA Q/0.,0./
C
        CALL LPAUTO(NEXP,IDAT+LASTFR,NC,IRCADR,NC1,IAADR,IALADR,
       1            IRADR,IERADR)
        CALL APGET(RC,IRCADR,NC+3*NC1,2)
        CALL APWAIT
        CALL APGET(SP(NC+1),ICMP,N,2)
        CALL APWAIT
C
C           COMPUTE NOISE-SHAPING FILTER
C
        DO 5 I=0,2
        RHO(I+1) = 0.
        DO 2 J=1,NC1-1
    2   RHO(I+1) = RHO(I+1) + A(I+J)*A(J)
    5   CONTINUE
        B(1) = -RHO(2)/RHO(1)
        IF(B(1) .GT. .5) B(1) = .5
        IF(B(1) .LT. -.5) B(1) = -.5
        B(2) = 0.
C       DEN = RHO(1)**2 - RHO(2)**2
C       B(1) = (RHO(2)*(RHO(3)-RHO(1)))/DEN
C       B(2) = (RHO(2)**2 - RHO(1)*RHO(3))/DEN
C       IF(ABS(B(1)) .LE. .75 .AND. ABS(B(2)).LE. .75) GO TO 15
C       B(1) = 0.
C       B(2) = 0.
C
C       DO 10 I=1,NC
C  10   TYPE 101,RC(I),A(I),AL(I),R(I)
C       TYPE *,' A(9),RHO:=',A(9),(RHO(I),I=1,3)
  101   FORMAT(10X,4E15.5)
C
   15   GAIN = SQRT(AL(1)/AL(NC1))
        DO 20 I=NC1,N+NC
   20   SPQ(I) = SP(I)
```

```
         IF(IOHT .EQ. 0) GO TO 210
         DO 50 I=1,N
         TEMP = 0.
         DO 40 J=1,NC1
   40    TEMP = TEMP + A(J)*SP(I+NC1-J)
C        RES(I) = GAIN*TEMP
         RES(I) = TEMP
   50    ABSRES(I) = ABS(RES(I))
         LBIN = (IPIT + NRE/2)/NRE
         DO 60 I=1,LBIN-1
   60    ABSRES(I+N) = ABSRES(I)
         RESMAX = 0.
         MAXLOC = 1
         DO 70 I=1,IPIT

DO 65 J=1,LBIN-1
   65    ABSRES(I) = ABSRES(I)*ABSRES(I+J)
         IF(ABSRES(I) .LT. RESMAX) GO TO 70
         RESMAX = ABSRES(I)
         MAXLOC = I
   70    CONTINUE
C
         DO 75 I=1,NRE
   75    NBIN(I) = LBIN
         NREM = IPIT - NRE*LBIN
         IF(NREM) 80,90,85
   80    NREM = -NREM
         DO 82 I=1,NREM
   82    NBIN(I) = NBIN(I)-1
         GO TO 90
   85    DO 88 I=1,NREM
   88    NBIN(I) = NBIN(I) + 1
   90    LOCBIN(1) = 1
         DO 92 I=1,NRE
   92    LOCBIN(I+1) = LOCBIN(I) + NBIN(I)
         DO 94 I=1,NRE+1
         IF(MAXLOC .LE. LOCBIN(I)) GO TO 95
   94    CONTINUE
   95    NREM = LOCBIN(I) - MAXLOC
         NBIN(NRE+1) = NREM
         NBIN(I) = NBIN(I) - NREM
         DO 96 I=1,NRE+1
   96    LOCBIN(I+1) = LOCBIN(I) + NBIN(I)
         DO 98 I=2,NRE
   98    ABIN(I) = 1.5*ABSRES(LOCBIN(I))/LBIN
         I = LOCBIN(NRE+1)
         IF(I .GT. IPIT) I = I-IPIT
         ABIN(1) = 1.5*ABSRES(I)/LBIN
         ABIN(NRE+1) = ABIN(1)
C
C               FIND BIT-ALLOCATION
C
         CALL BITAL(NRE,NRBITS,ABIN,IBIT)
         IBIT(NRE+1) = IBIT(1)
         DO 99 I=1,NRE+1
   99    IF(IBIT(I) .EQ. 1) ABIN(I) = 1.2*ABIN(I)
C
         SUM = 0.
         SUMERR = 0.
         IBASE = 0
         TYPE *,' B: = ',B(1),B(2)
         DO 200 IP=1,NPIT
         DO 120 IBIN = 1,NRE+1
         IF(NBIN(IBIN) .EQ. 0) GO TO 120
         DO 110 I=IBASE+LOCBIN(IBIN),IBASE+LOCBIN(IBIN+1)-1
         EPRED = 0.
         IF(IBIT(IBIN) .NE. 0 .AND. INS.NE.0)
     1         EPRED = B(1)*Q(1) + B(2)*Q(2)
         DO 105 J=1,NC1
  105    EPRED = EPRED + A(J)*SPQ(I+NC1-J)
         SUM = SUM + (EPRED/ABIN(IBIN))**2
         CALL QUANT(EPRED,ABIN(IBIN),IBIT(IBIN),EPREDQ,QERR,IFRAME)
         SPQ(I+NC) = SPQ(I+NC)+ QERR
         Q(2) = Q(1)
         Q(1) = QERR

SUMERR = SUMERR + (QERR/ABIN(IBIN))**2
  110    CONTINUE
  120    CONTINUE
  200    IBASE = IBASE + IPIT
         RMSRES = SQRT(SUM/N)
         RMSERR = SQRT(SUMERR/N)
         TYPE *,'      RMS RESIDUAL,ERROR = ',RMSRES,RMSERR
```

```
C           TYPE *,'         LBIN,LOCBIN(I)=',LBIN,LOCBIN(I)
C           DO 99 I=1,NRE+1
C   99      TYPE 103,NBIN(I),LOCBIN(I+1),ABIN(I)
C  103      FORMAT(10X,2I8,F12.6)
C           TYPE *,'         NOR. DATA'
C           TYPE 102,(SP(I+NC),I=1,32)
C           TYPE *,'         QUANTIZED:'
C           TYPE 102,(SPQ(I+NC),I=1,32)
    102     FORMAT(2X,8F9.4)
C
    210     CALL APPUT(SPQ(NC1),ICMP,N,2)
            DO 400 I=1,NC
            SPQ(I) = SPQ(I+N)
    400     SP(I) = SP(I+N)
            RETURN
            END
C
C                   ROUTINE APC-EC
C
            SUBROUTINE APCEC(N,NEXP,INS,NBITS,BITRAT)
            COMMON /APMEM/AP(10000)
            COMMON /BUK/DAT(180),AMP(180),GUN1,GUN2,GUN3,GREC,IDAT,JDAT,
         1  IAMP,JAMP,LFRM,LASTFR,IDIF,MSE,IPLEN(64),IFLEN(64),IPVAL(64),
         2  MINPT1,MINPIT,LPIT3,LPIT2,LPIT1,MAXPIT,MAXPT1,IPNORM,ICMP
            COMMON /APCBUK/NC,NC1,NRE,NRBITS,IRCADR,IAADR,IALADR,
         1  IRADR,IERADR,SP(188),SPQ(188),RES(195)
            COMMON /AUTPAR/RC(8),A(9),AL(9),R(9)
            DIMENSION Q(2),B(2),RHO(3),STEPM(16)
            DATA STEPM/2.,1.85,1.7,1.55,1.4,1.25,1.10,1.,.9,.8,.7,
         1      .6,.5,.4,.3,.2/
            DATA Q/0.,0./
C
            CALL LPAUTO(NEXP,IDAT+LASTFR,NC,IRCADR,NC1,IAADR,IALADR,
         1          IRADR,IERADR)
            CALL APGET(RC,IRCADR,NC+3*NC1,2)
            CALL APWAIT
            CALL APGET(SP(NC+1),ICMP,N,2)
            CALL APWAIT
C
C                   COMPUTE NOISE-SHAPING FILTER
C
            DO 5 I=0,2
            RHO(I+1) = 0.
            DO 2 J=1,NC1-I
    2       RHO(I+1) = RHO(I+1) + A(I+J)*A(J)
    5       CONTINUE
C           B(1) = - RHO(2)/RHO(1)
C           IF(B(1) .GT. .5) B(1) = .5
C           IF(B(1) .LT. -.5) B(1) = -.5
C           B(2) = 0.
            DEN = RHO(1)**2 - RHO(2)**2
            B(1) = (RHO(2)*(RHO(3)-RHO(1)))/DEN
            B(2) = (RHO(2)**2 - RHO(1)*RHO(3))/DEN

C           IF(ABS(B(1)) .LE. .75 .AND. ABS(B(2)).LE. .75) GO TO 15
C           B(1) = 0.
C           B(2) = 0.
C           DO 10 I=1,NC
C   10      TYPE 101,RC(I),A(I),AL(I),R(I)
C           TYPE *,' A(9),RHO:=',A(9),(RHO(I),I=1,3)
    101     FORMAT(10X,4E15.5)
C
    15      RMSSIG = SQRT(AL(1)/FLOAT(NEXP))
            RMSRES = SQRT(AL(NC1)/FLOAT(NEXP))
            GAIN = RMSSIG/RMSRES
            STPSIZ = STEPM(NRBITS)*RMSRES
            TYPE *,' RMS SIG.,RES.,STEP = ',RMSSIG,RMSRES,STPSIZ
            DO 20 I=NC1,N+NC
    20      SPQ(I) = SP(I)
C
            NBITS = 0
            SUM = 0.
            SUMERR = 0.
            DO 110 I=1,N
            EPRED = 0.
            IF(INS.NE.0) EPRED = B(1)*Q(1) + B(2)*Q(2)
            DO 105 J=1,NC1
    105     EPRED = EPRED + A(J)*SPQ(I+NC1-J)
            SUM = SUM + EPRED**2
            CALL QNTEC(EPRED,STPSIZ,EPREDQ,QERR,IBITS)
            NBITS = NBITS + IBITS
            SPQ(I+NC) = SPQ(I+NC)+ QERR
            Q(2) = Q(1)
            Q(1) = QERR
            SUMERR = SUMERR + QERR**2
```

```
110     CONTINUE
        RMSRES = SQRT(SUM/N)*GAIN
        RMSERR = SQRT(SUMERR/N)*GAIN
        BITRAT = FLOAT(NBITS)/FLOAT(N)
        TYPE *,' RMS RESIDUAL,ERROR,BIT-RATE = ',RMSRES,RMSERR,BITRAT
C
210     CALL *PPUT(SPO(NC1),ICMP,N,2)
        DO 400 I=1,NC
        SPO(I) = SPO(I+N)
400     SP(I) = SP(I+N)
        RETURN
        END
C
C              OPTIMUM UNIFORM GAUSSIAN QUANTIZER
C
        SUBROUTINE QUANT(A,ASD,NBIT,AQ,AQERR,IFRAME)
        DIMENSION STPSIZ(5),NPLVL(5)
        DATA STPSIZ/1.59577,.99569,.58602,.3352,.18814/
        DATA NPLVL/1,2,4,8,16/
        IF(NBIT .EQ. 0 .OR. NBIT.GT.5) GO TO 50
        APOS = ABS(A)/ASD
        AK = APOS/STPSIZ(NBIT)
        IF(AK .GT. 32.) AK = 32.
        K = AK
        K = MIN0(K,NPLVL(NBIT)-1)
        AQ = STPSIZ(NBIT)*ASD*(FLOAT(K) + .5)
        IF(A .LT. 0.) AQ = - AQ
        GO TO 100
50      AQ = 0.

100     AQERR = AQ - A
C       IF(IFRAME.GE.118) TYPE 101,NBIT,A,ASD,AQ,AQERR
101     FORMAT(10X,I4,4F15.6)
        RETURN
        END
C
C              OPTIMUM UNIFORM GAUSSIAN QUANTIZER
C
        SUBROUTINE QNTEC(A,STPSIZ,AQ,AQERR,IBITS)
        ICLIP = 1
        AK = ABS(A)/STPSIZ
        IF(AK .GT. 15.) AK = 15.
        K = AK + .5
        IF(K .GE. ICLIP) K = 0
        IF(K .EQ. 0) GO TO 10
        AQ = STPSIZ*(K+ICLIP)
        IF(A .LT. 0.) AQ = - AQ
        GO TO 15
10      AQ = 0.
        IBITS = 1
        GO TO 100
15      IF(AQ) 30,30,20
20      IBITS = 2*K
        GO TO 100
30      IBITS = 2*K + 1
100     AQERR = AQ - A
C       TYPE 101,IBITS,A,STPSIZ,AQ,AQERR
101     FORMAT(10X,I4,4F15.6)
        RETURN
        END
C
C              BIT-ALLOCATION ROUTINE
C
        SUBROUTINE BITAL(N,NBITS,A,IBIT)
        DIMENSION A(1),IBIT(1),ASQ(12),ASQERR(12),QMSE(6)
        DATA MAXBIT,QMSE/5,1.,.36338,.11885,.03744,.01154,.0035/
C
        DO 10 I=1,N
        ASQ(I) = A(I)*A(I)
        IBIT(I) = 0
10      ASQERR(I) = ASQ(I)*(QMSE(1) - QMSE(2))
C
        DO 50 J=1,NBITS
        K = 1
        ERRMAX = ASQERR(1)
        DO 20 I=2,N
        IF(ERRMAX .GT. ASQERR(I)) GO TO 20
        ERRMAX = ASQERR(I)
        K = I
20      CONTINUE
        M = IBIT(K) + 1
        IBIT(K) = M
        IF(M .EQ. MAXBIT) GO TO 30
        ASQERR(K) = ASQ(K)*(QMSE(M+1) - QMSE(M+2))
        GO TO 50
```

```
 30       ASQERR(K) = 0.
 50       CONTINUE
C         DO 60 I=1,N
C 60      TYPE 101,A(I),ASQ(I),ASQERR(I),IBIT(I)
 101      FORMAT(10X,3F12.6,I6)

RETURN
          END
C
C         INITIALIZATION ROUITNE
C
          SUBROUTINE INITLZ
          COMMON /APMEM/AP(10000)
          COMMON /BLK/DAT(180),AMP(180),LUN1,LUN2,LUN3,LREC,IDAT,JDAT,
        1 IAMP,JAMP,LFRM,LASTFR,IDIF,MSE,IPLEN(64),IFLEN(64),IPVAL(64),
        2 MINPT1,MINPIT,LPIT3,LPIT2,LPIT1,MAXPIT,MAXPT1,IPNORM,ICMP
          COMMON /APCBLK/NC,NCI,NRE,NRBITS,IRCADR,IAADR,IACADR,
        1 IRADR,IERADR,SP(188),SPQ(188),RES(195)
C               SKIP ONE RECORD OF AMPLITUDE FUNCTION TO
C               COMPENSATE FOR THE DELAY OF THE LOWPASS FILTER
          READ(LUN2) (AMP(I),I=1,90)
C               GET ONE FRAME OF DATA
          CALL GETNOR(IDAT,IAMP,IEND)
          LASTFR = 0
          MINPT1 = MINPIT - 1
          NCI = NC + 1
C
C               COMPUTE PITCH NORMALIZATION COEFF. AND STORE IN AP MEMORY
C
          DO 10 I=MINPIT,LPIT3
          IPVAL(I-MINPT1) = I
          IFLEN(I-MINPT1) = 6*I
          IPLEN(I-MINPT1) = 5*I
 10       DAT(I-MINPT1) = 1./FLOAT(5*I)
          DO 20 I=LPIT3+1,LPIT2
          IPVAL(I-MINPT1) = I
          IFLEN(I-MINPT1) = 4*I
          IPLEN(I-MINPT1) = 3*I
 20       DAT(I-MINPT1) = 1./FLOAT(3*I)
          DO 30 I=LPIT2+1,LPIT1
          IPVAL(I-MINPT1) = I
          IFLEN(I-MINPT1) = 2*I
          IPLEN(I-MINPT1) = I
 30       DAT(I-MINPT1) = 1./FLOAT(I)
          DO 40 I=LPIT1-MINPT1+1,64
          IPVAL(I) = IPVAL(I-1) + 2
          IPLEN(I) = IPVAL(I)
          IFLEN(I) = 2*IPVAL(I)
 40       DAT(I) = 1./FLOAT(IPLEN(I))
          CALL APPUT(DAT,IPNORM,64,2)
          CALL APWAIT
          DO 100 I=1,NC
          SP(I) = 0.
 100      SPQ(I) = 0.
 102      FORMAT(5X,16I4)
          RETURN
          END
C
C         GET INPUT DATA AND NORMALIZE BY AMPLITUDE FUNCTION
C
          SUBROUTINE GETNOR(LDAT,LAMP,IEND)
          BYTE A(90),C
          INTEGER AL2LNR
          EQUIVALENCE (C,IC)
          COMMON /APMEM/AP(10000)
          COMMON /BLK/DAT(180),AMP(180),LUN1,LUN2,LUN3,LREC,IDAT,JDAT,
        1 IAMP,JAMP,LFRM,LASTFR,IDIF,MSE,IPLEN(64),IFLEN(64),IPVAL(64),
        2 MINPT1,MINPIT,LPIT3,LPIT2,LPIT1,MAXPIT,MAXPT1,IPNORM,ICMP
C
C         READ TWO RECORDS AND CONVERT FROM LOG TO LINEAR
C
          IBASE = 0
          DO 100 IREC = 1,2
          READ(LUN1,101,END=999) A
          DO 20 J=1,LREC
          C = A(J)
 20       DAT(IBASE+J) = AL2LNR(IC)
 100      IBASE = IBASE + LREC
 101      FORMAT(90A1)
C
C         PUT DATA INTO ARRAY PROCESSOR MEMORY
C
```

```
        CALL APPUT(DAT,LDAT,LFRM,2)
        CALL APWAIT
C
C           GET AMPLITUDE FUNCTION AND PUT INTO ARRAY PROC. MEMORY
C
        READ(LUN2,END=999) (AMP(I),I=1,90)
        READ(LUN2,END=999) (AMP(I),I=91,180)
        DO 200 I=1,LFRM
 200    IF(AMP(I) .LT. 2.) AMP(I) = 2.
        CALL APPUT(AMP,LAMP,LFRM,2)
        CALL APWAIT
C
C           NORMALIZE DATA BY DIVIDE BY AMPLITUDE FUNCTION
C
        CALL VDIV(LAMP,1,LDAT,1,LDAT,1,LFRM)
        CALL APWAIT
        RETURN
 999    IEND = 1
        RETURN
        END
C
C           OUTPUT NORMALIZED DATA AFTER RENORMALIZATION
C
        SUBROUTINE PUTNOR(LDAT,LAMP,IHISTO)
        BYTE A(90),C
        INTEGER AL2LNR
        EQUIVALENCE (C,IC)
        DIMENSION IHISTO(1)
        COMMON /APMEM/AP(10000)
        COMMON /BLK/DAT(180),AMP(180),LUN1,LUN2,LUN3,LREC,IDAT,JDAT,
       1 IAMP,JAMP,LFRM,LASTFR,IDIF,MSE,IPLEN(64),IFLEN(64),IPVAL(54),
       2 MINPT1,MINPIT,LPIT3,LPIT2,LPIT1,MAXPIT,MAXPT1,IPNORM,ICHP
C************************************
C       DO 50 J=1,LFRM
C 50    AMP(J)=256.
C       CALL APPUT(AMP,LAMP,LFRM,2)
C       CALL APWAIT
C************************************
C
C           RENORMALIZE DATA BY MULTIPLY BY AMPLITUDE FUNCTION
C
        CALL VMUL(LAMP,1,LDAT,1,LDAT,1,LFRM)
        CALL VSMUL(LDAT,1,2,LDAT,1,LFRM)
        CALL APWAIT

CALL APGET(DAT,LDAT,LFRM,2)
        CALL APWAIT
C       DO 60 I=1,LFRM
C       K = DAT(I)*.125
C       K = MIN0(256,MAX0(K+128,1))
C 60    IHISTO(K) = IHISTO(K) + 1
C
C           CONVERT DATA TO A-LAW AND OUTPUT
C
        IBASE = 0
        DO 250 IREC=1,2
        DO 220 J=1,LREC
        ICC = DAT(J+IBASE)
        IF(ICC .GT. 2047) ICC=2047
        IF(ICC .LT. -2047) ICC = -2047
        IC = LNR2AL(ICC)
 220    A(J) = C
        WRITE(LUN3,101) A
 250    IBASE = IBASE + LREC
 101    FORMAT(90A1)
        RETURN
 999    IEND = 1
        RETURN
        END
C
C           CONVERT FROM LINEAR TO A-LAW
C
        FUNCTION LNR2AL(ICC)
        ISIGN=0
        IF(ICC .LT. 0) ISIGN="200
        ICC = IABS(ICC)
        KTH = 16
        DO 60 K=0,6
        IF(ICC .LT. KTH) GO TO 61
 60     KTH = KTH*KTH
 61     IF(K .EQ. 0) GO TO 62
        ICC = (ICC-KTH/2)/2**(K-1)
 62     ICC = ICC+K*16+ISIGN
        LNR2AL = IEOR(ICC,"125)
        RETURN
        END
```

```
C
C      FUNCTION TO CONVERT FROM A-LAW TO LINEAR

INTEGER FUNCTION AL2LNR(IC)
       IC=IEOR(IC,"125)
       ISIGN=1
       IF(IAND(IC,"200) .NE. 0) ISIGN=-1
       IEXP=IAND(IC,"160)/16
       IC=IAND(IC,"17)
       IF(IEXP .EQ. 0) GO TO 20
       IC=ISHFT(IC+16,IEXP-1)
20     AL2LNR=IC*ISIGN
       RETURN
       END
```

COPYRIGHT (C) 1986
RACAL MILGO
ALL RIGHTS RESERVED

UNPUBLISHED AND CONFIDENTIAL WORK

I claim:

1. A method of enhancing pitch detection in sampled speech signals by performing time domain speech envelope flattening, comprising the steps of:
   receiving a sampled time domain speech signal;
   deriving a time domain speech envelope from said sampled speech signal by performing the steps of:
      detecting peak signal levels in said sampled time domain speech signal, and
      filtering said detected peak signal levels to produce said time domain speech envelope signal from said peak signal levels of said speech signal;
   creating a sampled amplitude function by performing the steps of:
      sampling said time domain speech envelope at a sampling rate lower than a sampling rate for said sampled time domain speech signal to produce subrate samples;
      computing a plurality of interpolated points by interpolating values between adjacent ones of said subrate samples to produce interpolated values;
      generating a sampled amplitude function having a sample point corresponding to each sample of said sampled speech signal by assigning said subrate samples to corresponding amplitude function samples and assigning said interpolated values to each sample point located between said sample points; and
   normalizing said sampled time domain speech signal to produce time domain speech envelope flattening by performing a point by point division of said time domain speech signal samples by said corresponding amplitude function samples.

2. The method of claim 1, wherein said subrate samples are taken at a sampling rate between approximately 100 and 1000 Hz.

3. A method of enhancing pitch detection in sampled speech signals by performing time domain speech envelope flattening, comprising the steps of:
   receiving a sampled time domain speech signal;
   deriving a time domain speech envelope from said sampled speech signal;
   creating a sampled amplitude function by performing the steps of:
      sampling said time domain speech envelope at a sampling rate lower than a sampling rate for said sampled time domain speech signal to produce subrate samples;
      computing a plurality of interpolated points by interpolating values between adjacent ones of said subrate samples to produce interpolated values;
      generating a sampled amplitude function having a sample point corresponding to each sample of said sampled speech signal by assigning said subrate samples to corresponding amplitude function samples and assigning said interpolated values to each sample point located between said sample points; and
   normalizing said sampled time domain speech signal with the sampled amplitude function; and to produce time domain speech envelope flattening.

4. The method of claim 3, wherein the deriving step further comprises the steps of:
   detecting peak signal levels in said sampled time domain speech signal; and
   filtering said detected peak signal levels to produce said time domain speech envelope signal from said peak signal levels of said speech signal.

5. The method of claim 3, wherein said normalizing step is carried out by performing a point by point division of said time domain speech signal samples by said corresponding amplitude function samples.

6. The method of claim 3, wherein said subrate sampling is carried out at a sampling rate of between approximately 100 and 1000 Hz.

7. A method of enhancing pitch detection in sampled speech signals by performing time domain speech envelope flattening, comprising the steps of:
   receiving a sampled time domain speech signal;
   deriving a time domain speech envelope from said sampled speech signal by sampling said time domain speech envelope at a rate lower than a sampling rate for said sampled time domain speech signal;

creating a sampled amplitude function having a sample point corresponding to each sample of said sampled speech signal by assigning said subrate samples to corresponding amplitude function samples and assigning interpolated values to each sample point located between said sample points; and normalizing said sampled time domain speech signal with the sampled amplitude function to produce time domain speech envelope flattening.

8. A method of enhancing pitch detection in sampled speech signals by performing time domain speech envelope flattening, comprising the steps of:

receiving a sampled time domain speech signal;

deriving a time domain speech envelope from said sampled speed signal by performing the steps of:

detecting peak signal levels in said sampled time domain speech signal, and low pass filtering said detected peak signal levels with a low pass filter having a cutoff frequency between approximately 25 and 300 Hz to produce said time domain speech envelope signal from said peak signal levels of said speech signal;

creating a sampled amplitude function by performing the steps of:

sampling said time domain speech envelope at a sampling rate between approximately 100 and 1000 Hz to produce subrate samples;

computing a plurality of interpolated points by linear interpolating values between adjacent ones of said subrate samples using a low pass filter to produce interpolated values;

generating a sampled amplitude function having a sample point corresponding to each sample of said sampled speech signal by assigning said subrate samples to corresponding amplitude function samples and assigning said interpolated values to each sample point located between said sample points;

normalizing said sampled time domain speech signal to produce time domain speech envelope flattening by performing a point by point division of said time domain speech signal samples by said corresponding amplitude function samples; and pitch detecting said normalized signals.

* * * * *